(12) United States Patent
Matsui et al.

(10) Patent No.: US 8,446,066 B2
(45) Date of Patent: May 21, 2013

(54) ULTRASONIC MOTOR

(75) Inventors: Akira Matsui, Hino (JP); Hiroyuki Takizawa, Chofu (JP)

(73) Assignee: Olympus Corporation, Tokyo (JP)

( * ) Notice: Subject to any disclaimer, the term of this patent is extended or adjusted under 35 U.S.C. 154(b) by 331 days.

(21) Appl. No.: 13/014,135

(22) Filed: Jan. 26, 2011

(65) Prior Publication Data
US 2011/0187229 A1 Aug. 4, 2011

(30) Foreign Application Priority Data

Jan. 29, 2010 (JP) ................... 2010-019566

(51) Int. Cl.
*H02N 2/02* (2006.01)
*H01L 41/09* (2006.01)

(52) U.S. Cl.
USPC .................. 310/316.01; 310/317; 310/323.16

(58) Field of Classification Search
USPC ................. 310/316.01, 317, 323.16
See application file for complete search history.

(56) References Cited

U.S. PATENT DOCUMENTS

| | | | | |
|---|---|---|---|---|
| 4,734,610 A * | 3/1988 | Okumura et al. | ............... | 313/23 |
| 4,868,447 A * | 9/1989 | Lee et al. | ....................... | 310/328 |
| 5,723,935 A * | 3/1998 | Tomikawa et al. | ........ | 310/323.02 |
| 2011/0187229 A1* | 8/2011 | Matsui et al. | ............. | 310/323.16 |
| 2011/0187231 A1* | 8/2011 | Takizawa et al. | ......... | 310/323.16 |
| 2011/0204748 A1* | 8/2011 | Matsui | ...................... | 310/323.16 |
| 2011/0234049 A1* | 9/2011 | Takizawa | .................. | 310/323.12 |
| 2012/0019103 A1* | 1/2012 | Matsui | ...................... | 310/323.02 |
| 2012/0038246 A1* | 2/2012 | Sakamoto | ................ | 310/323.16 |

FOREIGN PATENT DOCUMENTS

JP 09-085172 3/1997

* cited by examiner

*Primary Examiner* — Thomas Dougherty
(74) *Attorney, Agent, or Firm* — Scully, Scott, Murphy & Presser, PC

(57) ABSTRACT

An ultrasonic motor is configured as follows. Namely, the ultrasonic motor includes an oscillator whose cross section vertical to a central axis has a rectangular shape which has a predetermined length ratio of a narrow side and a wide side, wherein the oscillator comprises driving electrodes and oscillation detecting electrodes near a node portion of the longitudinal oscillation and near ventral portions of the torsional oscillation, an external electrode achieving electrical conduction with the driving electrodes and an external electrode associated with one polarity of an external electrode achieving the electrical conduction with the oscillation detecting electrodes are formed on a first surface of outer surfaces of the oscillator, and an external electrode associated with the other polarity of the external electrode achieving the electrical conduction with the oscillation detection electrodes is formed on a second surface different from the first surface of the outer surfaces of the oscillator.

5 Claims, 10 Drawing Sheets

To drive circuit

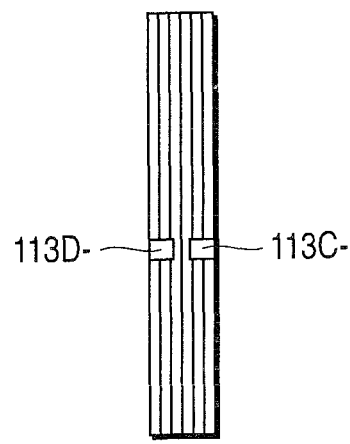
F I G. 12
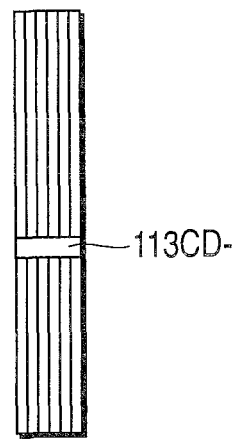
F I G. 13
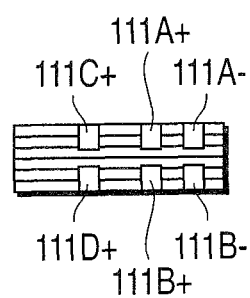
F I G. 14

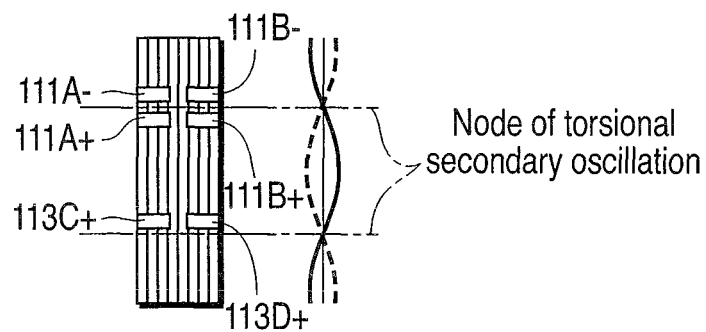
F I G. 21
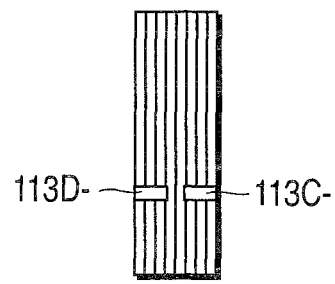
F I G. 22
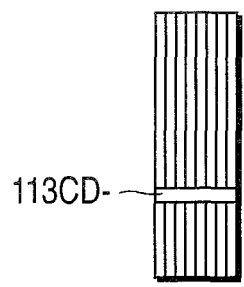
F I G. 23

ULTRASONIC MOTOR

CROSS-REFERENCE TO RELATED APPLICATIONS

This application is based upon and claims the benefit of priority from prior Japanese Patent Application No. 2010-019566, filed Jan. 29, 2010, the entire contents of which are incorporated herein by reference.

BACKGROUND OF THE INVENTION

1. Field of the Invention

The present invention relates to an ultrasonic motor that utilizes oscillation of an oscillator of, e.g., a piezoelectric element, and more particularly to an ultrasonic motor that utilizes elliptic oscillation produced when longitudinal oscillation and torsional oscillation are simultaneously excited.

2. Description of the Related Art

In recent years, as a new motor that substitutes for an electromagnetic motor, an ultrasonic motor that utilizes oscillation of an oscillator of, e.g., a piezoelectric element attracts attention. As compared with a conventional electromagnetic motor, this ultrasonic motor has advantages in that, e.g., low-speed and high thrust can be obtained without a gear, retaining force is high, resolution is high, quietness is high, and magnetic noise can be prevented from being generated.

Specifically, for example, when an oscillator formed of an ultrasonic oscillator is pressed against a rotor that is a driven member trough a frictional member fixed on the oscillator, frictional force is generated between the frictional member and the rotor, and the rotor is driven by using this frictional force.

In more detail, when longitudinal oscillation and torsional oscillation are simultaneously generated in the ultrasonic oscillator, elliptic oscillation as a combination of these oscillations is produced at an end face of the ultrasonic oscillator, and the rotor is rotated by utilizing this elliptic oscillation. As a technology concerning such an ultrasonic motor, for example, JP-A 9-85172 (KOKAI) discloses the following technology.

That is, JP-A 9-85172 (KOKAI) discloses an ultrasonic motor comprising: a rod-like elastic body; a plurality of holding elastic bodies provided on a side surface of the rod-like elastic body to be integral with the rod-like elastic body; a plurality of pairs of laminated piezoelectric elements arranged in such a manner that each piezoelectric element is held at both ends by each of the plurality of holding elastic bodies and forms an acute angle between a displacement direction thereof and a longitudinal direction of the rod-like elastic body and that the plurality of pairs of these piezoelectric elements are inclined in opposite directions; a plurality of oscillation detecting piezoelectric elements provided between the laminated piezoelectric elements and the holding elastic bodies; a friction block provided on an end face of the rod-like elastic body; a rotor arranged being appressed against the friction block by pressing means; and power supplying means for applying alternating voltages having predetermined frequencies and intensities associated with phases or amplitudes of signals output from the oscillation detection piezoelectric elements and having phase differences to the respective pairs of laminated piezoelectric elements. In this ultrasonic motor, longitudinal oscillation and torsional oscillation are simultaneously excited in the rod-like elastic body, whereby ultrasonic elliptic oscillation is excited on the friction block, thus driving the rotor to rotate.

Specifically, according to the technology disclosed in JP-A 9-85172 (KOKAI), one or more pairs of laminated piezoelectric elements are held between the holding elastic bodies each having a concave portion into which the laminated piezoelectric element can be inserted and the rod-like elastic body. Further, the holding elastic bodies are arranged to abut on the laminated piezoelectric elements, compression stress is applied, and the laminated piezoelectric elements are fixed to the rod-like elastic body through screws in this state.

Therefore, when adopting the configuration disclosed in JP-A 9-85172 (KOKAI), each holding elastic body used for fixing the piezoelectric element is an essential constituent element, and concave portions in which the holding elastic body and the piezoelectric element are arranged must be formed in the rod-like elastic body. As described above, it is difficult to simplify and miniaturize the structure of the oscillator by the technology disclosed in JP-A 9-85172 (KOKAI).

Further, since a configuration that a plurality of oscillation detecting piezoelectric elements are provided between the plurality of pairs of laminated piezoelectric elements and a holding elastic body is adopted, required wiring lines are two wiring lines for driving and two wiring lines for oscillation detection per phase. That is, when adopting two-phase driving, as many as the eight wiring lines are required, which is a factor that obstructs the miniaturization.

BRIEF SUMMARY OF THE INVENTION

The present invention has been made in consideration of the above situation, and has as its object to provide an ultrasonic motor in which the number of the wiring lines connected to the driving circuit is reduced to enable miniaturization of the oscillator.

According to an aspect of the present invention, there is provided an ultrasonic motor comprising:

an oscillator whose cross section vertical to a central axis has a rectangular shape and which generates elliptic oscillation when longitudinal oscillation that expands or contracts in the central axis direction and torsional oscillation using the central axis as a torsional axis are simultaneously excited, a length ratio of a narrow side and a wide side constituting the rectangular shape being set to a predetermined value;

a driven body that comes into contact with an elliptic oscillation generation surface of the oscillator in which the elliptic oscillation is generated and is driven to rotate by the elliptic oscillation around the central axis; and a pressing mechanism unit that presses the oscillator against the driven body and welds the elliptic oscillation generation surface of the oscillator to the driven body by pressing, wherein the oscillator comprises driving electrodes and oscillation detecting electrodes near a node portion of the longitudinal oscillation and near ventral portions of the torsional oscillation, an external electrode achieving electrical conduction with the driving electrodes and an external electrode associated with one polarity of an external electrode achieving the electrical conduction with the oscillation detecting electrodes are formed on a first surface of outer surfaces of the oscillator, and an external electrode associated with the other polarity of the external electrode achieving the electrical conduction with the oscillation detection electrodes is formed on a second surface different from the first surface of the outer surfaces of the oscillator.

According to the present invention, it is possible to provide an ultrasonic motor in which the number of the wiring lines connected to the driving circuit is reduced to enable miniaturization of the oscillator.

Advantages of the invention will be set forth in the description which follows, and in part will be obvious from the description, or may be learned by practice of the invention. Advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 12 is a view showing a structural example of the oscillator (a side surface) seen from an X direction depicted in FIG. 11;

FIG. 13 is a view showing a structural example of the oscillator (a side surface) seen from the X direction depicted in FIG. 11;

FIG. 14 is a view showing a structural example of the oscillator (a bottom surface) seen from a Y direction depicted in FIG. 10;

FIG. 21 is a view showing a structural example of the oscillator (a side surface) seen from an X1 direction depicted in FIG. 20;

FIG. 22 is a view showing a structural example of the oscillator (a side surface) seen from an X2 direction depicted in FIG. 20; and FIG. 23 is a view showing a structural example of the oscillator (a side surface) seen from the X2 direction depicted in FIG. 20.

DETAILED DESCRIPTION OF THE INVENTION

Hereinafter, embodiments according to the present invention will be described hereinafter with reference to the accompanying drawings.

[First Embodiment]

Figure 1:
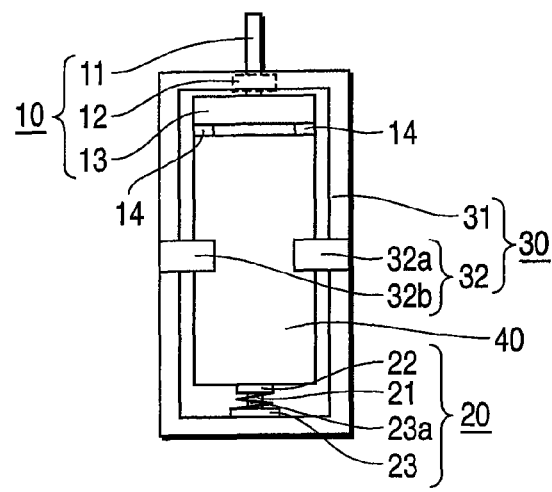
FIG. 1 is a front view showing a structural example of an ultrasonic motor according to a first embodiment of the present invention.

FIG. 1 is a front view showing a structural example of an ultrasonic motor according to a first embodiment of the present invention. As shown in FIG. 1, the ultrasonic motor according to this first embodiment includes a rotor mechanism unit 10, a pressing mechanism unit 20, a housing unit 30, and an oscillator 40.

The rotor mechanism unit 10 has a rotary shaft (a central shaft) 11, a bearing 12, and a rotor 13.

The rotary shaft 11 is a shaft member coupled with a central portion of the rotor 13. It is to be noted that each constituent member in the rotor mechanism unit 10 is concentrically arranged with respect to this rotary shaft 11.

The bearing 12 is a bearing member that is fixed to a frame 31 included in the later-described housing unit 30 and has the rotary shaft 11 inserted therein.

The rotor 13 is arranged to come into contact with a frictional member 14 provided on an upper surface of the oscillator 40. This rotor 13 is caused to slide by the frictional member 14, with elliptic oscillation excited on the upper surface of the oscillator 40 being used as a driving source, whereby the rotor 13 rotates round the rotary shaft 11.

The pressing mechanism unit 20 has a pressing spring 21, a pressing member 22, and a fixed plate 23 having a spring regulation member 23a provided thereto.

The pressing spring 21 is a spring member configured to press the later-described oscillator 40 against the rotor 13. Specifically, this pressing spring 21 is, e.g., a leaf spring or a coil spring.

The pressing member 22 is provided at a substantially central portion of a bottom surface (a surface facing the pressing mechanism unit 20) of the oscillator 40, and pressing force of the pressing spring 21 is transmitted to the oscillator 40 via the pressing member 22.

The fixed plate 23 is fixed to the later-described frame 31 and has the spring regulation member 23a provided thereto as a protruding portion that positions the pressing spring 21. This spring regulation member 23a is inserted in the pressing spring 21 to position the pressing spring 21.

The housing unit 30 has the frame 31 and a support member 32.

The frame 31 is a frame member having a substantially rectangular parallelepiped outer shape and holds the oscillator 40 together with the pressing mechanism unit 20 and the support member 32.

The support member 32 is constituted of a support member 32a and a support member 32b which face each other and which are provided to the frame 31 to sandwich the oscillator 40 between both the sides of the frame 31. This support member 32 is provided at, e.g., a position corresponding to a node portion of longitudinal primary oscillation excited by the oscillator 40.

The oscillator 40 adopts a later-described configuration, and the frictional member 14 that is in contact with the rotor 13 is provided on an upper end surface (a surface facing the rotor mechanism unit 10) thereof.

Figure 2:
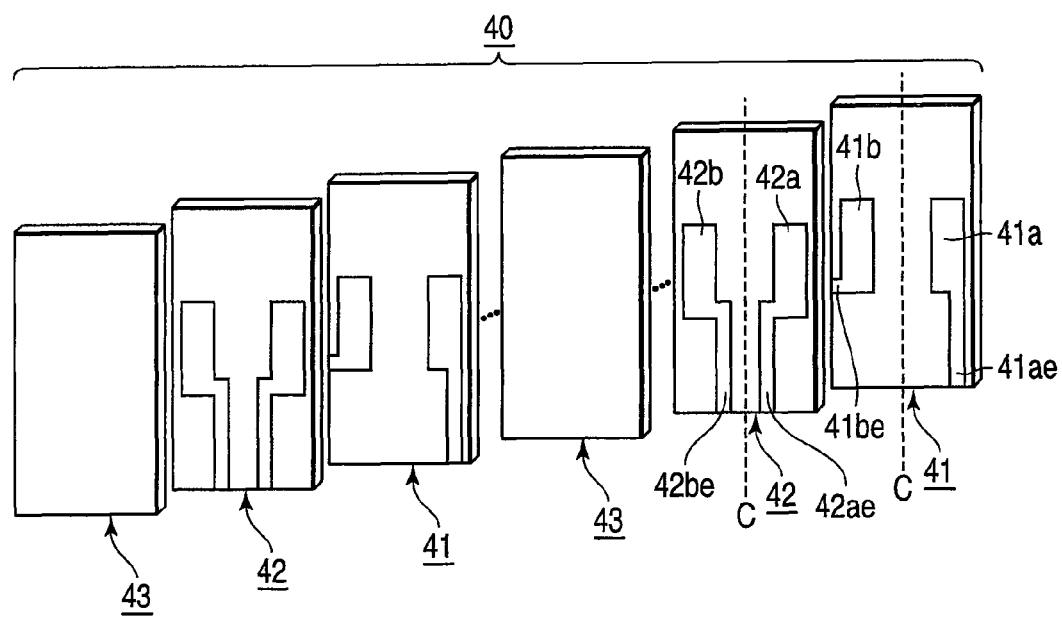
FIG. 2 is a view showing a structural example of piezoelectric sheets constituting an oscillator.

FIG. 2 is a view showing a structural example of piezoelectric sheets constituting the oscillator 40. The oscillator 40 is constructed by alternately laminating a first piezoelectric sheet 41 and a second piezoelectric sheet 42 in a thickness direction thereof, and a third piezoelectric sheet 43 is arranged in the uppermost region and an intermediate region of this laminated body obtained by lamination.

The first piezoelectric sheet 41, the second piezoelectric sheet 42, and the third piezoelectric sheet 43 are rectangular sheet-like piezoelectric elements. As the first piezoelectric sheet 41, the second piezoelectric sheet 42, and the third piezoelectric sheet 43, for example, piezoelectric ceramics elements consisting of a hard type lead zirconate titanate (PZT) is used. Although particulars will be described later, internal electrodes each having an activated region obtained by polarization in the thickness direction are provided in each of the first piezoelectric sheet 41 and the second piezoelectric sheet 42. As this internal electrode, for example, a silver-palladium alloy having a thickness of 4 μm can be used.

On an electrode forming surface of the first piezoelectric sheet 41, an internal electrode 41$a$ and an internal electrode 41$b$ are provided to be symmetrical with respect to a central line C (a line that bisects a narrow side). In detail, these internal electrodes 41$a$ and 41$b$ are provided at predetermined positions (which will be described later) on the electrode forming surface of the first piezoelectric sheet 41.

Figure 3:
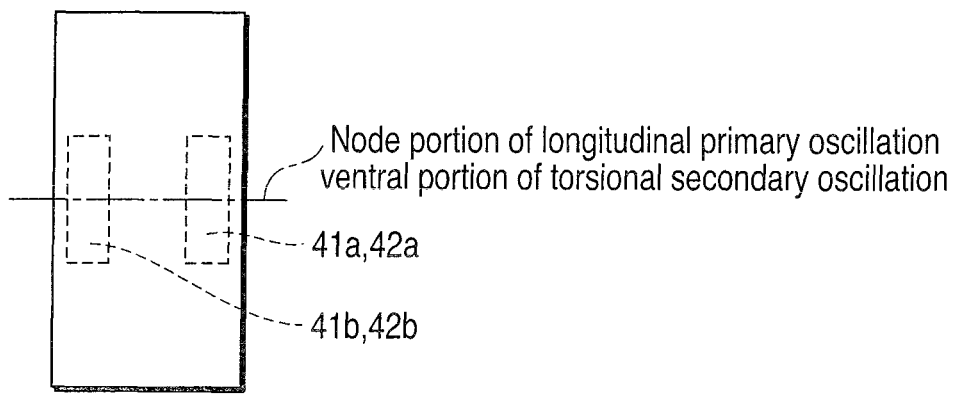
FIG. 3 is a view showing a structural example of the oscillator.

FIG. 3 is a view showing positions on the electrode forming surface of the piezoelectric sheet (the first piezoelectric sheet 41 or the second piezoelectric sheet 42) corresponding to a node portion of longitudinal primary oscillation and ventral portions of torsional secondary oscillation excited in the oscillator 40.

As shown in FIG. 3, the internal electrodes 41$a$ and 41$b$ are provided at positions corresponding to the node portion of the longitudinal primary oscillation and the ventral portions of the torsional secondary oscillation excited in the oscillator 40. Furthermore, an exposed portion 41$ae$ extended toward an edge of one narrow side of the first piezoelectric sheet 41 is provided to the internal electrode 41$a$ as shown in FIG. 2. An exposed portion 41$be$ extended toward an edge of one wide side of the first piezoelectric sheet 41 is provided to the internal electrode 41$b$.

On an electrode forming surface of the second piezoelectric sheet 42, an internal electrode 42$a$ is provided at a position associated with the internal electrode 41$a$ when laminated, and an internal electrode 42$b$ is provided at a position associated with the internal electrode 41$b$ when laminated. The internal electrodes 42$a$ and 42$b$ are provided exposed portions 42$ae$ and 42$be$ extended to sides associated with (overlapping at the time of lamination) the sides to which the exposed portions 41$ae$ and 41$be$ of the internal electrodes 41$a$ and 41$b$ are extended, respectively.

Here, the exposed portion 41$ae$ and the exposed portion 42$ae$ are provided to deviate from each other at a predetermined interval so that they do not overlap each other when laminated. On the other hand, the exposed portion 41$be$ and the exposed portion 42$be$ do not overlap each other obviously when laminated since the sides to which these exposed portions are extended are not associated with each other.

Figure 4:
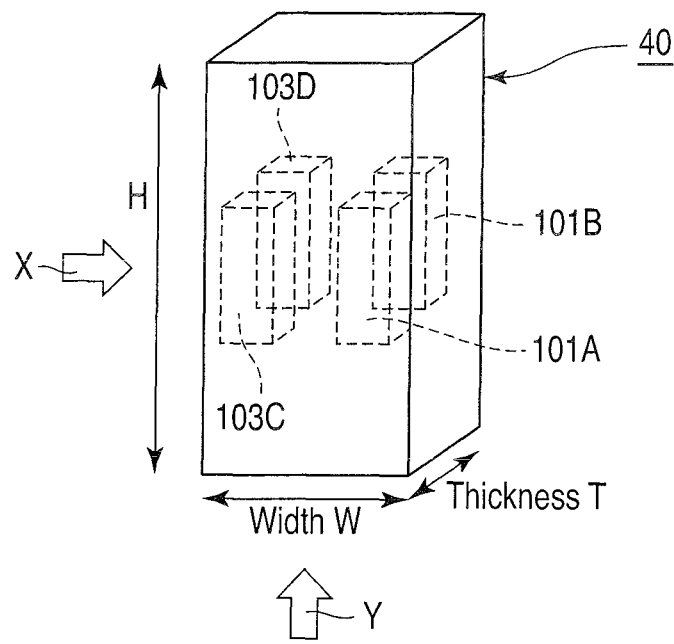
FIG. 4 is a view showing a structural example of the oscillator.

As explained above, overlapping the first piezoelectric sheet 41, the second piezoelectric sheet 42, and the third piezoelectric sheet 43 enables obtaining the oscillator 40 depicted in FIG. 4. It is to be noted that, in FIG. 4, driving electrodes and oscillation detecting electrodes (which are constituted of the above internal electrodes) present in the oscillator 40 are visualized and illustrated, and the respective piezoelectric sheets are not individually illustrated but integrally shown as the oscillator 40 for convenience of explanation.

As shown in FIG. 3 and FIG. 4, in the oscillator 40, a region where the internal electrode 41$a$ and the internal electrode 42$a$ are laminated constitutes a driving electrode 101A or 101B (particulars will be described later). A region where the internal electrode 41$b$ and the internal electrode 42$b$ are laminated constitutes an oscillation detecting electrode 103C or 103D (particulars will be described later). Moreover, positions occupied by the driving electrodes 101A and 101B and the oscillation detecting electrodes 103C and 103D in the oscillator 40 are positions associated with the node portion of the longitudinal primary oscillation and the ventral portions of the torsional secondary oscillation in oscillations excited in the oscillator 40.

Additionally, the driving electrode 101A and the driving electrode 101B are constituted to be symmetrical with respect to a third piezoelectric sheet arranged in an intermediate region in a laminating direction of the piezoelectric sheets. The oscillation detecting electrode 103C and the oscillation detecting electrode 103D are constituted to be symmetrical with respect to the third piezoelectric sheet arranged in the intermediate region in the laminating direction of the piezoelectric sheets.

Figure 5:
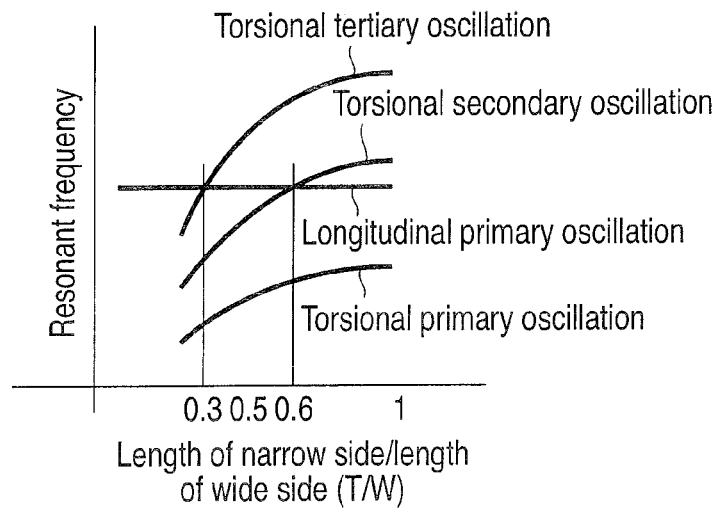
FIG. 5 is a view showing resonant frequency characteristics of longitudinal oscillation and torsional oscillation.

Here, as shown in FIG. 4, it is assumed that H is a height, T is a thickness (a narrow side), and W is a width (a long side) of the oscillator 40. Further, when the height H is fixed, an abscissa represents a value (the thickness T/the width W), and an ordinate represents a value of a resonant frequency in each oscillation mode, characteristics shown in FIG. 5 can be obtained. Specifically, the following characteristics can be obtained.

A value of a resonant frequency in a longitudinal primary oscillation mode takes a substantially fixed value without being dependent on a value of (T/W).

Values of resonant frequencies in the torsional primary oscillation mode, the torsional secondary oscillation mode, and the torsional tertiary oscillation mode increase with an increase in value of (T/W).

A resonant frequency in the torsional primary longitudinal mode does not coincide with a resonant frequency in the longitudinal primary oscillation mode irrespective of a value of (T/W).

A resonant frequency in the torsional secondary oscillation mode coincides with a resonant frequency in the longitudinal primary longitudinal mode in the vicinity of 0.6 which is a value of (T/W).

A resonant frequency in the torsional tertiary oscillation mode coincides with a resonant frequency in the longitudinal primary oscillation mode in the vicinity of 0.3 which is a value of (T/W).

Since the above-described characteristics are provided, the following settings are configured.

When utilizing the longitudinal primary oscillation mode and the torsional tertiary oscillation mode, the thickness T and the width W of the oscillator 40 are set so that a value of (T/W) can fall within the range of 0.25 to 0.35.

When utilizing the longitudinal primary oscillation mode and the torsional secondary oscillation mode, the thickness T and the width W of the oscillator 40 are set so that a value of (T/W) can fall within the range of 0.55 to 0.65.

The ultrasonic motor according to this first embodiment is designed so that a value of (T/W) can become approximately 0.6 since the torsional secondary oscillation is utilized as the torsional oscillation. As a result, a resonant frequency in the longitudinal primary oscillation mode is substantially conformed with a resonant frequency in the torsional secondary oscillation mode.

Figure 6:
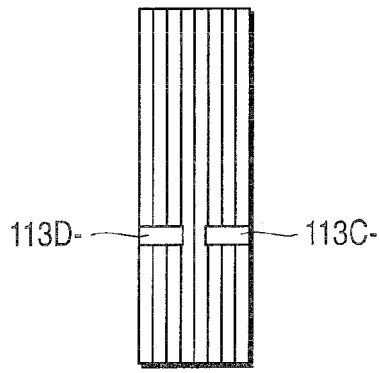
FIG. 6 is a view showing a structural example of an oscillator (a side surface) seen from an X direction depicted in FIG. 4.

FIG. 6 is a view showing a structural example of the oscillator 40 (a left side surface) seen from an X direction depicted in FIG. 4.

That is, as shown in FIG. 2, FIG. 4. and FIG. 6, the exposed portions 41be of the internal electrode 41b constituting an oscillation detecting electrode (a C− phase) 103C− or an oscillation detecting electrode (a D− phase) 103D− are short-circuited by an external electrode.

In the example depicted in FIG. 6, the exposed portions 41be associated with the oscillation detecting electrode (the C− phase) 103e are short-circuited by an external electrode 113C−. Likewise, the exposed portions 41be associated with the oscillation detecting electrode (the D− phase) 103D− are short-circuited by an external electrode 113D−.

Figure 8:
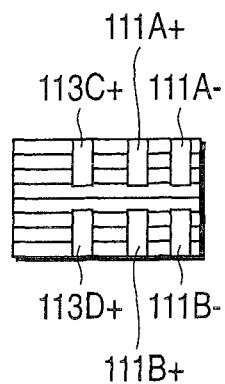
FIG. 8 is a view showing a structural example of the oscillator (a bottom surface) seen from a Y direction depicted in FIG. 4.

FIG. 8 is a view showing a structural example of the oscillator 40 (a bottom surface) seen from a Y direction depicted in FIG. 4. As shown in FIG. 2, FIG. 4, and FIG. 8, the external electrodes are formed on the bottom surface of the oscillator 40 as follows.

The exposed portions 42ae associated with a driving electrode (an A+ phase) 101A+ are short-circuited by an external electrode 111A+.

The exposed portions 41ae associated with a driving electrode (an A− phase) 101A− are short-circuited by an external electrode 111A−.

The exposed portions 42ae associated with a driving electrode (a B+ phase) 101B+ are short-circuited by an external electrode 111B+.

The exposed portions 41ae associated with a driving electrode (a B− phase) 101B− are short-circuited by an external electrode 111B−.

The exposed portions 42be associated with an oscillation detecting electrode (a C+ phase) 103C+ are short-circuited by an external electrode 113C+.

The exposed portions 42be associated with an oscillation detecting electrode (a D+ phase) 103D+ are short-circuited by an external electrode 113D+.

Figure 7:
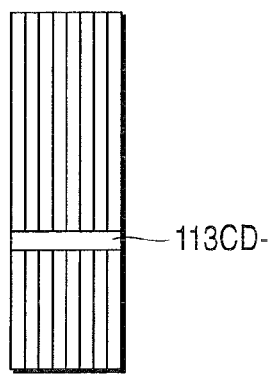
FIG. 7 is a view showing a structural example of the oscillator (a side surface) seen from the X direction depicted in FIG. 4.

As described above, in this first embodiment, in regard to the external electrodes associated with the oscillation detecting electrodes, each external electrode having one polarity is provided on a surface where the external electrodes of the driving electrodes are provided. Further, each external electrode having the other polarity is provided on another surface of the oscillator (a side surface of the oscillator 40). Furthermore, the external electrodes 113C− and 113D− associated with the oscillation detecting electrodes provided on the side surface of the oscillator 40 depicted in FIG. 6 are short-circuited by, e.g., a lead wire. It is to be noted that the external electrode 113C− and the external electrode 113D− depicted in FIG. 6 may be integrally short-circuited by using an external electrode 113CD− as shown in FIG. 7. Adopting such a configuration enables realizing a reduction in the number of wiring lines connected to a driving circuit as shown in FIG. 9.

Figure 9:
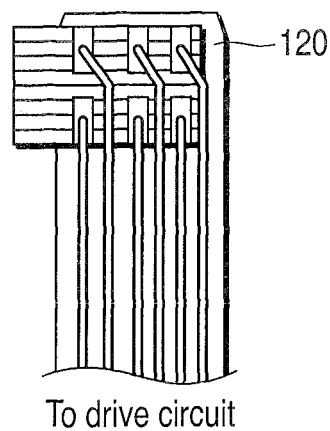
FIG. 9 is a view showing a wiring example on the bottom surface of the oscillator.

FIG. 9 is a view showing a wiring line example on the bottom surface of the oscillator 40. That is, wiring lines connected to the driving circuit (not shown) are six wiring lines associated with the six external electrodes 111A−, 111A+, 111B−, 111B+, 113C+, and 113D+ provided on the oscillator bottom surface. This connection may be achieved by utilizing a flexible substrate 120 as shown in FIG. 9.

A driving method for the ultrasonic motor according to the first embodiment will now be described hereinafter.

When a value of (T/W) is set to approximately 0.6 as described above, a resonant frequency in the longitudinal primary oscillation mode substantially coincides with a resonant frequency in the torsional secondary oscillation mode.

For example, in-phase alternating voltages having the resonant frequency are applied to a driving electrode (an A phase) 101A and a driving electrode (a B phase) 101B. It is to be noted that a drive frequency is set to a resonant frequency of the longitudinal primary oscillation and the torsional secondary oscillation. At this time, a region associated with the driving electrode (the A phase) 101A and a region associated with the driving electrode (the B phase) 101B oscillate in phase. As a result, the oscillator 40 longitudinally oscillates. At this moment, the same potential is produced in an oscillation detecting electrode (a C phase) 103C and an oscillation detecting electrode (a D phase) 103D.

On the other hand, when anti-phase alternating voltages (having a phase difference of 180°) are applied to the driving electrode (the A phase) 101A and the driving electrode (the B phase) 101B, the region associated with the driving electrode (the A phase) 101A and the region associated with the driving electrode (the B phase) 101B oscillate in opposite phases. As a result, the oscillator 40 torsionally oscillates. At this moment, potentials having different signs are produced in the oscillation detecting electrode (the C phase) and the oscillation detecting electrode (the D phase).

Moreover, when alternating voltages having different phases (having a phase difference of, e.g., 90°) are applied to the driving electrode (the A phase) 101A and the driving electrode (the B phase) 101B of the oscillator 40 having the above-described oscillation characteristics, the longitudinal primary oscillation and the torsional secondary oscillation can be simultaneously excited in the oscillator 40. In the oscillator 40 in which the longitudinal primary oscillation and the torsional secondary oscillation have been simultaneously excited, elliptic oscillation is produced at an upper end surface thereof. Here, the frictional member 14 provided on the upper end surface of the oscillator 40 is pressed against the rotor 13 by pressing force of the pressing mechanism unit 20, and the rotor 13 is driven to rotate by the elliptic oscillation at the upper end surface of the oscillator 40.

Additionally, when the phase difference between the alternating voltage applied to the driving electrode (the A phase) 101A and the alternating voltage applied to the driving electrode (the B phase) 101B is reversed, a rotating direction of the elliptic oscillation produced in the oscillator 40 can be reversed, thereby driving the rotor 13 to rotate in a reverse direction. When the phase difference between the alternating voltage applied to the driving electrode (the A phase) 101A and the alternating voltage applied to the driving electrode (the B phase) 101B is controlled in this manner, the rotating direction of the rotor 13 can be controlled.

Meanwhile, the oscillation detecting electrode (the C phase) 103C and the oscillation detecting electrode (the D phase) 103D generate the same potential in the longitudinal primary oscillation mode. On the other hand, in the torsional secondary oscillation mode, they generate potentials having different signs.

Therefore, in a state that the longitudinal primary oscillation and the torsional secondary oscillation are simultaneously excited in the oscillator 40, when a difference between the potential generated in the oscillation detecting electrode (the C phase) and the potential generated in the oscillation detecting electrode (the D phase) 103D is calculated, a longitudinal primary oscillation component is canceled out, and a component corresponding to the torsional secondary oscillation can be detected.

Specifically, when the external electrode 113C− is connected to the external electrode 113D− to detect a difference between a potential in the external electrode 113C+ and a potential in the external electrode 113D+, a component associated with the torsional secondary oscillation alone can be detected.

It is to be noted that, when the oscillation detecting electrode (the C phase) 101C or the oscillation detecting electrode (the D phase) 101D is polarized in a direction opposite to a polarizing direction depicted in FIG. 6 to FIG. 8, a longitudinal oscillation component alone can be detected. For example, when the polarizing direction of the oscillation detecting electrode (the D phase) 101D is reversed, the external electrode 113C+ and the external electrode 113D− are arranged on the bottom surface of the oscillator 40. At this time, a signal obtained by adding a signal produced in the oscillation detecting electrode (the C phase) and a signal produced in the oscillation detecting electrode (the D phase) is generated in a portion between the external electrode 113C+ and the external electrode 113D−. That is, a torsional oscillation component which is a reversed-phase component is canceled out, and a longitudinal oscillation component alone can be detected.

As described above, according to this first embodiment, it is possible to provide the ultrasonic motor in which the number of the wiring lines connected to the driving circuit is reduced to enable miniaturization of the oscillator.

It is to be noted, to realize the miniaturization of the oscillator constituting the ultrasonic motor, a reduction in size of each external electrode is required, problems in manufacture (e.g., a limit in reducing a gap between the external electrodes and a limit in reducing a size of each external electrode itself) must be considered in this reduction in size of each external electrode. This is a factor obstructing the miniaturization of oscillator, thereby making it difficult to miniaturize the oscillator.

Thus, in the ultrasonic motor according to this first embodiment, the miniaturization of the oscillator is realized by reducing the number of the external electrodes themselves (and the number of the wiring lines drawn from these external electrodes) arranged on "a specific surface (the bottom surface in the above-described example) where the external electrodes concerning connection with the drive circuit" are arranged. Benefits obtained by overcoming the restrictions in manufacture and reducing the number of the wiring lines to realize the miniaturization are considerable for persons skilled in the art.

Specifically, the ultrasonic motor according to this first embodiment exercises the following effects.

When the external electrodes connected to the drive circuit alone are arranged on a specific surface (the bottom surface of the oscillator 40 in the above-described example), the number of the external electrodes and the number of the wiring lines to be drawn on the specific surface are reduced (four wiring lines for driving and two wiring lines for oscillation detection).

The single piezoelectric element alone constitutes the oscillator, and the configuration of the oscillator is simplified, thereby realizing the miniaturization.

Since frequency tracking based on an oscillation detection signal acquired by the oscillation detecting electrode can be performed, further stable driving can be effected.

It is to be noted that "the specific surface" on which the external electrodes connected to the drive circuit are provided is "the bottom surface" of the oscillator 40, and the other external electrodes are provided on "the side surface" of the oscillator 40. However, "the specific surface" on which the external electrodes connected to the drive circuit are provided may be of course "the side surface" of the oscillator 40 and the other external electrodes may be provided on "the bottom surface" of the oscillator 40 without being restricted to the above configuration.

[Second Embodiment]

An ultrasonic motor according to this second embodiment will now be described. It is to be noted that differences from the ultrasonic motor according to the first embodiment will be described to avoid a tautological explanation.

In the ultrasonic motor according to this second embodiment, torsional tertiary oscillation is utilized as torsional oscillation. That is, design is performed in such a manner that the value of (T/W) becomes approximately 0.3. As a result, a resonant frequency in a longitudinal primary oscillation mode is substantially conformed to a resonant frequency in a torsional tertiary oscillation mode. It is to be noted that a drive frequency is set to the resonant frequency of longitudinal primary oscillation and the torsional tertiary oscillation.

Figure 10:
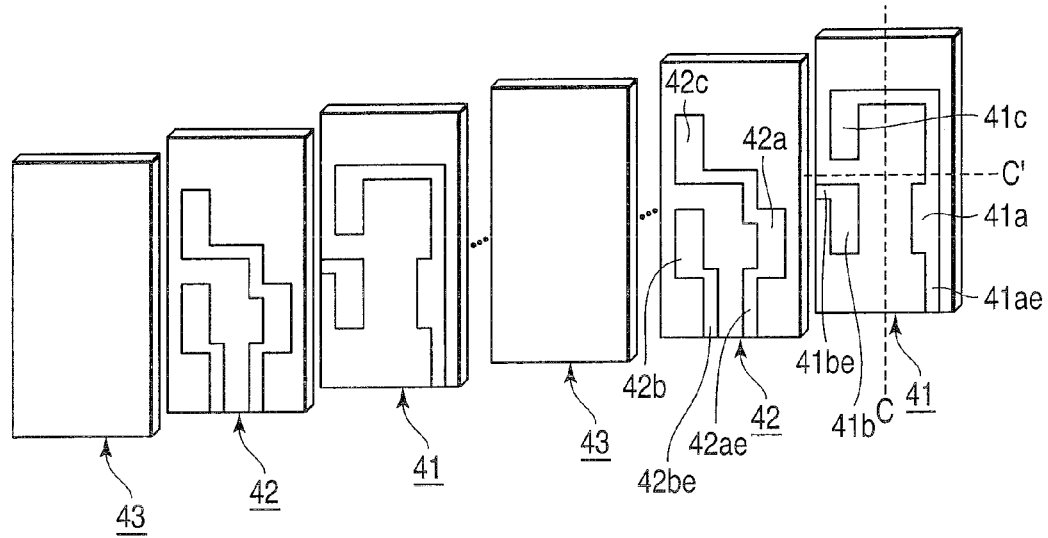
FIG. 10 is a view showing a structural example of piezoelectric sheets constituting an oscillator in an ultrasonic motor according to a second embodiment.

FIG. 10 is a view showing a structural example of piezoelectric sheets constituting an oscillator 40 in the ultrasonic motor according to this second embodiment. The oscillator 40 is constituted by alternately laminating a first piezoelectric sheet 41 and a second piezoelectric sheet 42 that are rectangular sheet-like piezoelectric elements in a thickness direction thereof, and a third piezoelectric sheet 43 is arranged in the uppermost region and an intermediate region of the laminated body obtained by lamination.

An internal electrode 41a, an internal electrode 41b, and an internal electrode 41c are provided on an electrode forming surface of the first piezoelectric sheet 41 at positions corresponding to ventral portions of the torsional tertiary oscillation excited in the oscillator 40, respectively. In more detail, the internal electrode 41a and the internal electrode 41b are provided to be symmetrical with respect to a central line C (a line that bisects a narrow side). Further, the internal electrode 41b and the internal electrode 41c are provided to be symmetrical with respect to a central line C' (a line that bisects a wide side).

Furthermore, an exposed portion 41ae extended toward an edge of one narrow side of the first piezoelectric sheet 41 is provided to the internal electrode 41a. An exposed portion 41be extended toward an edge of one wide side of the first piezoelectric sheet 41 is provided to the internal electrode 41b. The internal electrode 41c is electrically connected with the internal electrode 41a.

On an electrode forming surface of the second piezoelectric sheet 42, an internal electrode 42a is provided at a position associated with the internal electrode 41a when laminated, an internal electrode 42b is provided at a position associated with the internal electrode 41b when laminated, and an internal electrode 42c is provided at a position associated with the internal electrode 41c when laminated. An exposed portion 42ae extended toward an edge of one narrow side of the second piezoelectric sheet 42 is provided to the internal electrode 42a. Likewise, an exposed portion 42be extended toward the edge of the one narrow side of the second piezoelectric sheet 42 is provided to the internal electrode 42b. The internal electrode 42c and the internal electrode 42a are electrically connected to each other.

Here, the exposed portion 41ae and the exposed portion 42ae are formed to be shifted at a predetermined interval so that they cannot overlap at the time of lamination. The exposed portions 41be and the exposed portion 42be of course do not overlap each other at the time of lamination since the sides to which they are extended are side that are not associated with each other. Furthermore, no internal electrode is provided on the third piezoelectric sheet 43.

Figure 11:
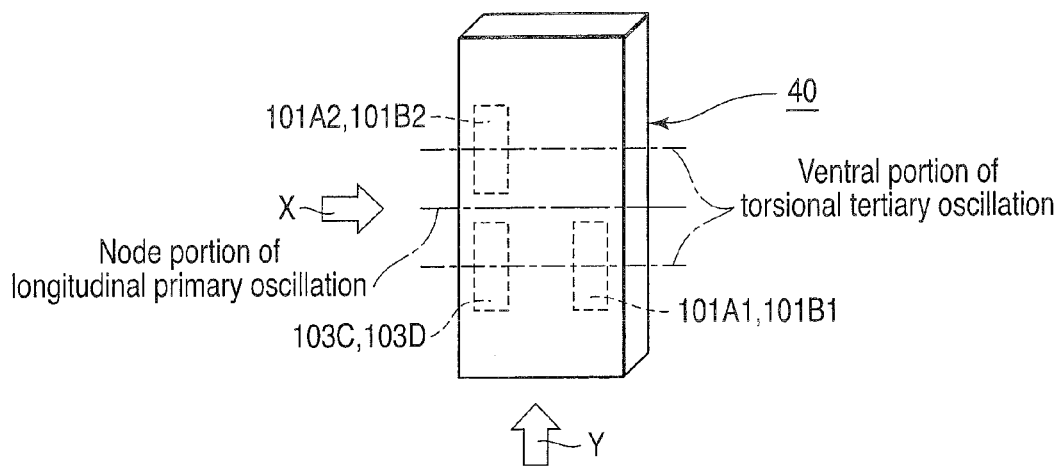
FIG. 11 is a view showing a structural example of the oscillator.

As described above, laminating the first piezoelectric sheet 41, the second piezoelectric sheet 42, and the third piezoelectric sheet 43 enables obtaining the oscillator 40 depicted in FIG. 11. It is to be noted that the electrodes present in the oscillator 40 are visualized and illustrated in FIG. 11 and the respective piezoelectric sheets are not individually shown but integrally depicted as the oscillator 40 for convenience of explanation.

As shown in FIG. 10 and FIG. 11, in a region where the internal electrode 41a and the internal electrode 42a are laminated in the oscillator 40, one side of the driving electrodes 101A1 and 101B1 with the third piezoelectric sheet 43 arranged in the intermediate region being sandwiched therebetween (a front side of the oscillator 40 depicted in FIG. 11; which will be the same hereinafter) constitutes the driving electrode 101A1, and the other side (a far side of the oscillator 40 depicted in FIG. 11; which will be the same hereinafter) constitutes the driving electrode 101B1. A region where the internal electrode 41c and the internal electrode 42c are laminated constitutes the driving electrode 101A2 or 101B2 (one side of these electrodes with the third piezoelectric sheet 43 arranged in the intermediate region being sandwiched therebetween constitutes the driving electrode 101A2, and the other side of the same constitutes the driving electrode 101B2). A region where the internal electrode 41b and the internal electrode 42b are laminated constitutes the oscillation detecting electrode 103C or 103D.

Additionally, positions occupied by the driving electrodes 101A1, 101B1, 101A2, and 101B2 and the oscillation detecting electrodes 103C and 103D in the oscillator 40 correspond to ventral portions of torsional tertiary oscillation in oscillations excited in the oscillator 40.

Meanwhile, the driving electrodes 101A1 and 101A2 function as driving electrodes having an A phase, and the driving electrodes 101B1 and 101B2 function as a B phase.

FIG. 12 is a view showing a structural example of the oscillator 40 (a side surface) seen from an X direction depicted in FIG. 11.

As shown in FIG. 10, FIG. 11, and FIG. 12, the exposed portions 41be of the internal electrode 41b constituting the oscillation detecting electrode (the C− phase) 103C− or the oscillation detecting electrode (the D− phase) 103D− are short-circuited by an external electrode.

In the example depicted in FIG. 12, the exposed portions 41be associated with the oscillation detecting electrode (the C− phase) 103C− are short-circuited by the external electrode 113C−. Likewise, the exposed portions 41be associated with the oscillation detecting electrode (the D− phase) 103D− are short-circuited by the external electrode 113D−.

FIG. 14 is a view showing a structural example of the oscillator 40 (a bottom surface) seen from a Y direction depicted in FIG. 10. As shown in this drawing, external electrodes are formed on the bottom surface of the oscillator 40 as follows.

The exposed portions 42ae associated with a driving electrode (an A1+ phase) 101A1+ and a driving electrode (an A2+ phase) 101A2+ are short-circuited by an external electrode 111A+.

The exposed portions 41ae associated with a driving electrode (an A1− phase) 101A1− and a driving electrode (an A2− phase) 101A2− are short-circuited by an external electrode 111A−.

The exposed portions 42ae associated with a driving electrode (a B1+ phase) 101B1+ and a driving electrode (a B2+ phase) 101B2+ are short-circuited by an external electrode 111B+.

The exposed portions 41ae associated with a driving electrode (a B1− phase) 101B1− and a driving electrode (a B2− phase) 101B2− are short-circuited by an external electrode 111B−.

The exposed portions 42be associated with an oscillation detecting electrode (a C+ phase) 103C+ are short-circuited by an external electrode 113C+.

The exposed portions 42be associated with an oscillation detecting electrode (a D+ phase) 103D+ are short-circuited by an external electrode 113D+.

As described above, in regard to the external electrodes associated with the oscillation detecting electrodes, each external electrode having one polarity is provided on the surface of the oscillator 40 where the external electrodes for the driving electrodes are provided, and each external electrode having the other polarity is provided on a different surface (the side surface of the oscillator 40). Further, the external electrodes 113C− and 113D− associated with the oscillation detecting electrodes provided on the side surface of the oscillator 40 depicted in FIG. 12 are short-circuited by, e.g., a lead wire. It is to be noted that the external electrode 113C− and the external electrode 113D− depicted in FIG. 12 may be integrally short-circuited by the external electrode 113CD− as shown in FIG. 13. Adopting such a configuration enables realizing a reduction in the number of the wiring lines connected to the drive circuit as shown in FIG. 14.

That is, the wiring lines connected to the drive circuit (not shown) are six wiring lines associated with the six external electrodes 111A−, 111A+, 111B−, 111B+, 113C+, and 113D+ provided on the oscillator bottom surface. To achieve this connection, a flexible substrate (not shown) may be utilized.

As described above, according to this second embodiment, it is possible to provide the ultrasonic motor that exercises the same effects as those of the ultrasonic motor according to the first embodiment and has further improved drive force since the number of the driving electrodes can be doubled.

[Third Embodiment]

An ultrasonic motor according to this third embodiment will now be described. It is to be noted that differences from the ultrasonic motor according to the first embodiment will be described to avoid a tautological explanation.

Figure 15:
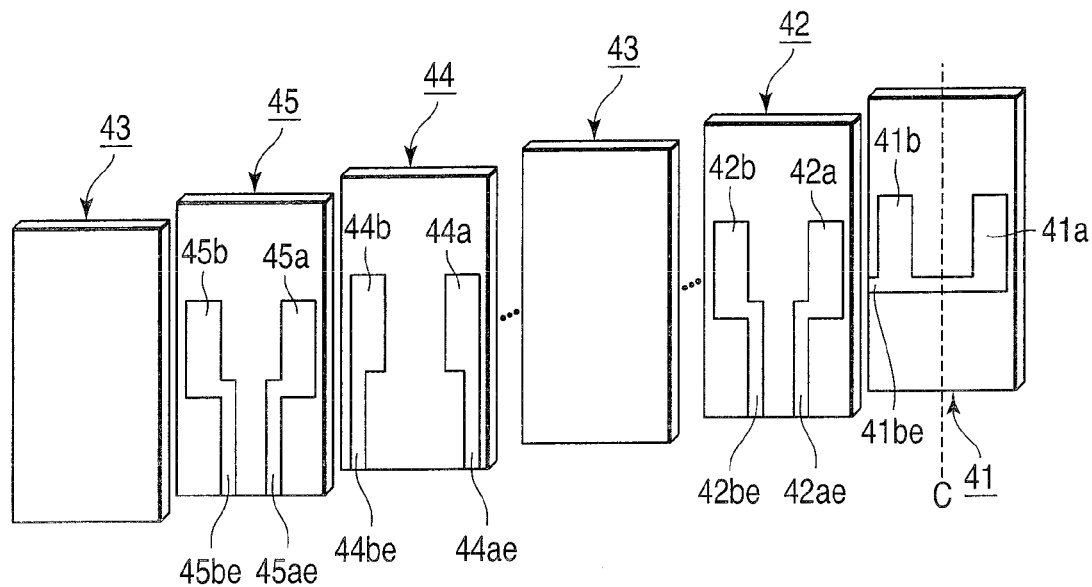
FIG. 15 is a view showing a structural example of piezoelectric sheets constituting an oscillator 40 in an ultrasonic motor according to a third embodiment.

FIG. 15 is a view showing a structural example of piezoelectric sheets constituting an oscillator 40 in an ultrasonic motor according to this third embodiment. That is, a first piezoelectric sheet 41 and a second piezoelectric sheet 42 that are rectangular sheet-like piezoelectric elements are alternately laminated in a thickness direction thereof to provide a predetermined thickness, a third piezoelectric sheet 43 is arranged thereon, a fourth piezoelectric sheet 44 and a fifth piezoelectric sheet 45 are alternately laminated in a thickness direction thereof to provide a predetermined thickness, and the third piezoelectric sheet 43 is arranged in the uppermost region.

On an electrode forming surface of the first piezoelectric sheet 41, an internal electrode 41a and an internal electrode 41b are provided to be symmetrical with respect to a central line C (a line that bisects a narrow side). In more detail, the internal electrode 41a and the internal electrode 41b are provided at positions corresponding to a node portion of longitudinal oscillation and ventral portions of torsional secondary oscillation in the oscillator 40.

An exposed portion 41be extended toward an edge of one wide side of the first piezoelectric sheet 41 is provided to the internal electrode 41b. Here, the internal electrode 41a and the internal electrode 41b are electrically connected to each other.

On an electrode forming surface of the second piezoelectric sheet 42, an internal electrode 42a is provided at a position associated with the internal electrode 41a when laminated, and an internal electrode 42b is provided at a position associated with the internal electrode 41b when laminated.

An exposed portion 42ae extended toward an edge of one narrow side of the second piezoelectric sheet 42 is provided to the internal electrode 42a. Likewise, an exposed portion 42be extended toward the edge of the one narrow side of the second piezoelectric sheet 42 is provided to the internal electrode 42b.

No internal electrode is provided on the third piezoelectric sheets 43.

On an electrode forming surface of the fourth piezoelectric sheet 44, an internal electrode 44a is provided at a position associated with the internal electrodes 41a and 42a when laminated, and an internal electrode 44b is provided at a position associated with the internal electrodes 41b and 42b when laminated. An exposed portion 44ae extended toward an edge of one narrow side of the fourth piezoelectric sheet 44 is provided to the internal electrode 44a. Likewise, an exposed portion 44be extended toward the edge of the one narrow side of the fourth piezoelectric sheet 44 is provided to the internal electrode 44b.

On an electrode forming surface of the fifth piezoelectric sheet 45, an internal electrode 45a is provided at a position associated with the internal electrode 44a when laminated, and an internal electrode 45b is provided at a position associated with the internal electrode 44b when laminated.

An exposed portion 45ae extended toward an edge of one narrow side of the fifth piezoelectric sheet 45 is provided to the internal electrode 45a. Likewise, an exposed portion 45be extended toward the edge of the one narrow side of the fifth piezoelectric sheet 45 is provided to the internal electrode 45b.

It is to be noted the exposed portion 44ae and the exposed portion 45ae are provided to be shifted at a predetermined interval so that they cannot overlap each other when laminated. Likewise, the exposed portion 44be and the exposed portion 45be are provided to be shifted at a predetermined interval so that they cannot overlap each other.

Figure 16:
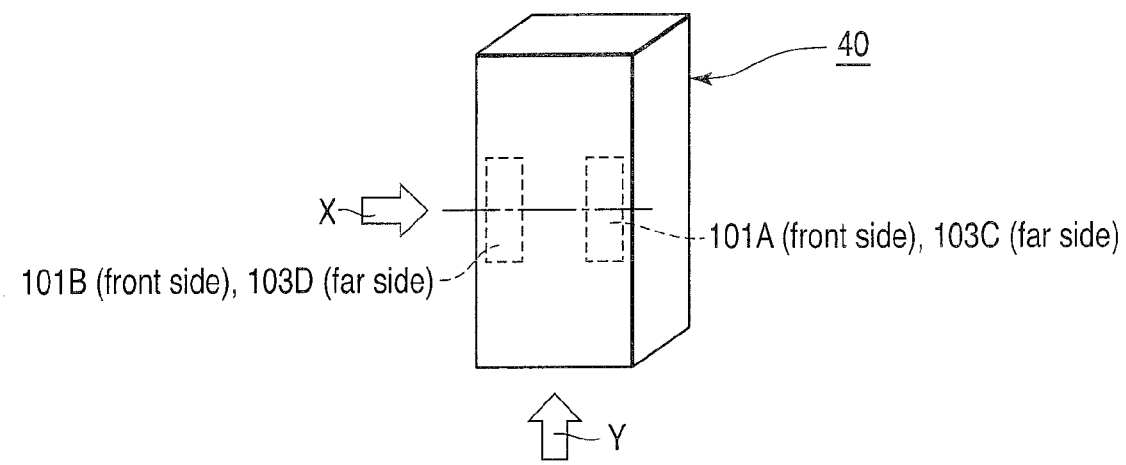
FIG. 16 is a view showing a structural example of the oscillator.

As described above, laminating the first piezoelectric sheet 41, the second piezoelectric sheet 42, the third piezoelectric sheet 43, the fourth piezoelectric sheet 44, and the fifth piezoelectric sheet 45 enables obtaining the oscillator 40 depicted in FIG. 16. It is to e noted that, in FIG. 16, the electrodes present in the oscillator 40 are visualized and illustrated and the respective piezoelectric sheets are not individually shown but integrally depicted for convenience of explanation.

As shown in FIG. 16, in the oscillator 40, a region where the internal electrode 44a and the internal electrode 45a are laminated constitutes a driving electrode 101A. A region where the internal electrode 44b and the internal electrode 45b are laminated constitutes a driving electrode 101B. A region where the internal electrode 41a and the internal electrode 42a are laminated constitutes an oscillation detecting electrode 103C. A region where the internal electrode 41b and the internal electrode 42b are laminated constitutes an oscillation detecting electrode 103D.

Furthermore, positions occupied by the driving electrodes 101A and 101B and the oscillation detecting electrodes 103C and 103D in the oscillator 40 are corresponding to a node portion of longitudinal primary oscillation and ventral portions of torsional secondary oscillation in oscillations excited in the oscillator 40.

Meanwhile, the driving electrode 101A functions as a driving electrode having an A phase, and the driving electrode 101B functions as a driving electrode having a B phase. Each of the oscillation detecting electrodes 103C and 103D functions as an electrode (a C phase or a D phase) configured to detect oscillation in the oscillator 40.

Figure 17:
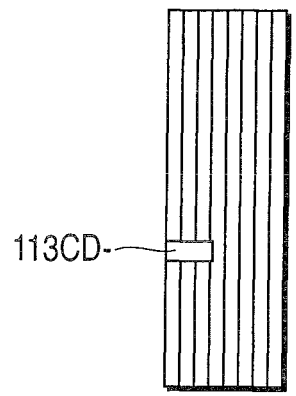
FIG. 17 is a view showing a structural example of an oscillator (a side surface) seen from the X direction depicted in FIG. 11.

FIG. 17 is a view showing a structural example of the oscillator 40 (a side surface) seen from the X direction depicted in FIG. 11. As described above, since the internal electrode 41a and the internal electrode 41b are short-circuited, when the exposed portions 41be of the internal electrode 41b constituting an oscillation detecting electrode (a D-phase) 103D− are short-circuited by an external electrode 113CD−, the oscillation detecting electrode (the C−phase) and the oscillation detecting electrode (the D−phase) are substantially short-circuited. As a result, the number of wiring lines can be further reduced.

Figure 18:
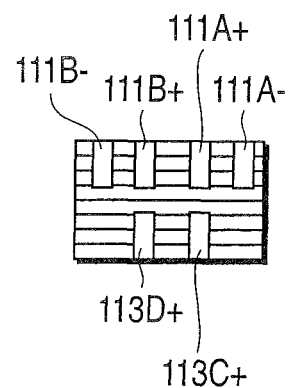
FIG. 18 is a view showing a structural example of the oscillator (a bottom surface) seen from a Y direction depicted in FIG. 16.

FIG. 18 is a view showing a structural example of the oscillator 40 (a bottom surface) seen from a Y direction depicted in FIG. 16. As shown in this drawing, external electrodes are formed on the bottom surface of the oscillator 40 as follows.

The exposed portions 45ae associated with a driving electrode (an A+ phase) 101A+ are short-circuited by an external electrode 111A+.

The exposed portions 44ae associated with a driving electrode (an A− phase) 101A− are short-circuited by an external electrode 111A−.

The exposed portions 45be associated with a driving electrode (a B+ phase) 101B+ are short-circuited by an external electrode 111B+.

The exposed portions 44be associated with a driving electrode (a B− phase) 101B− are short-circuited by an external electrode 111B−.

The exposed portions 42ae associated with an oscillation detecting electrode (a C+ phase) 103C+ are short-circuited by an external electrode 113C+.

The exposed portions 42be associated with an oscillation detecting electrode (a D+phase) 103D+ are short-circuited by an external electrode 113D+.

As described above, in regard to the external electrodes associated with the oscillation detecting electrodes, the external electrodes having one polarity are provided on the surface where the external electrodes for the driving electrodes are provided in the oscillator 40, and the external electrodes having the other polarity are provided on another surface (the side surface of the oscillator 40), thereby realizing a reduction in the number of the wiring lines.

As described above, according to this third embodiment, it is possible to provide the ultrasonic motor that can exercise the same effects as those of the ultrasonic motor according to the first embodiment and further reduce the number of wiring lines by short-circuiting the oscillation detecting electrodes on each internal electrode forming surface.

Although the present invention has been described based on the first to third embodiments, the present invention is not restricted to the foregoing embodiments, and it can be of course modified and applied in many ways within the gist of the present invention.

[Modification]

An ultrasonic motor according to a modification that is applicable to all of the first embodiment to the third embodiment will now be described. It is to be noted that differences from the ultrasonic motor according to the first embodiment will be described to avoid a tautological explanation. In this modification, a specific surface on which external electrodes connected to a drive circuit is determined as a side surface of an oscillator 40.

Figure 19:
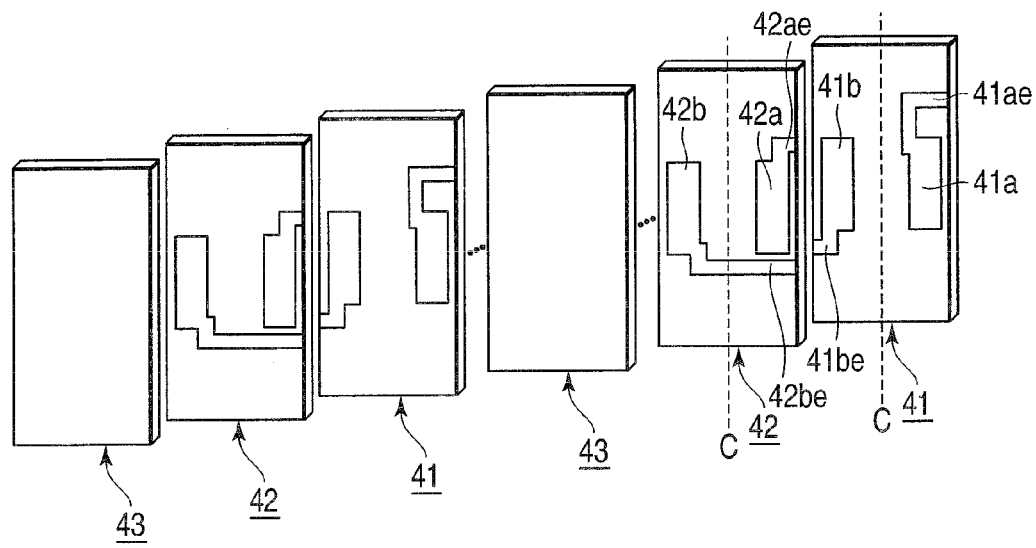
FIG. 19 is a view showing a structural example of piezoelectric sheets constituting an oscillator in an ultrasonic motor according to a modification.

FIG. 19 is a view showing a structural example of piezoelectric sheets constituting an oscillator 40 in an ultrasonic motor according to this modification. As shown in this drawing, a first piezoelectric sheet 41 and a second piezoelectric sheet 42 that are rectangular sheet-like piezoelectric elements are alternately laminated in a thickness direction thereof, and a third piezoelectric sheet 43 is arranged in each of the uppermost region and an intermediate region of a laminated body obtained by the lamination.

On an electrode forming surface of the first piezoelectric sheet 41, an internal electrode 41a and an internal electrode 41b are provided to be symmetrical with respect to a central line C (a line that bisects a narrow side). In more detail, the internal electrode 41a and the internal electrode 41b are provided at positions corresponding to a node portion of longitudinal primary oscillation and ventral portions of torsional secondary oscillation excited in the oscillator 40. An exposed portion 41ae extended toward an edge of one wide side of the first piezoelectric sheet 41 is provided to the internal electrode 41a. An exposed portion 41be extended toward an edge of the other wide side of the first piezoelectric sheet 41 is provided to the internal electrode 41b.

On an electrode forming surface of the second piezoelectric sheet 42, an internal electrode 42a is provided at a position associated with the internal electrode 41a when laminated, and an internal electrode 42b is provided at a position associated with the internal electrode 41b when laminated. An exposed portion 42ae extended toward an edge of one wide side of the second piezoelectric sheet (a wide side associated with the wide side to which the exposed portion 41ae is extended, which will be the same hereinafter) is provided to the internal electrode 42a. Likewise, an exposed portion 42be extended toward the edge of the one wide side of the second piezoelectric sheet 42 is provided to the internal electrode 42b.

Here, the exposed portion 41ae and the exposed portion 42ae are provided to be shifted at a predetermined interval so that they cannot overlap each other when laminated. The exposed portion 41be and the exposed portion 42be do not of course overlap each other at the time of lamination since the sides to which they are extended are sides that are not associated with each other. Further, no internal electrode is provided on the third piezoelectric sheet 43.

Figure 20:
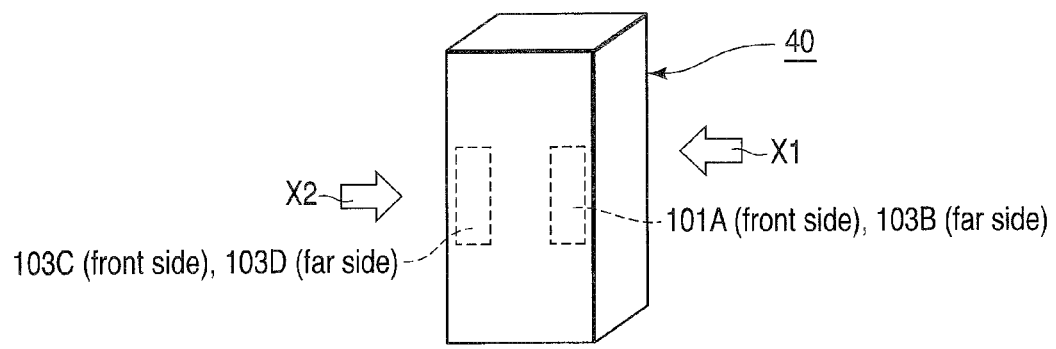
FIG. 20 is a view showing a structural example of an oscillator.

As described above, laminating the first piezoelectric sheet 41, the second piezoelectric sheet 42, and the third piezoelectric sheet 43 enables obtaining the oscillator 40 depicted in FIG. 20. It is to be noted that, in FIG. 20, the electrodes present in the oscillator 40 are visualized and illustrated and the respective piezoelectric sheets are not individually shown but integrally depicted as the oscillator 40 for convenience of explanation.

No internal electrode is provided on the third piezoelectric sheet 43.

As shown in FIG. 20, in the oscillator 40, a region where the internal electrode 41a and the internal electrode 42a are laminated constitutes a driving electrode 101A or 101B. A region where the internal electrode 41b and the internal electrode 42b are laminated constitutes an oscillation detecting electrode 103C or 103D. Furthermore, positions occupied by the driving electrodes 101A and 101B and the oscillation detecting electrodes 103C and 103D in the oscillator 40 are positions corresponding to a node portion of longitudinal primary oscillation and ventral portions of torsional secondary oscillation in oscillations excited in the oscillator 40.

In more detail, the third piezoelectric sheet 43 arranged at the substantially central position of the oscillator 40 in the thickness direction divides a driving electrode 101 into the driving electrode (an A phase) 101A and the driving electrode (a B phase) 101B. Likewise, an oscillation detecting electrode 103 is divided into the oscillation detecting electrode (a C phase) 103C and the oscillation detecting electrode (a D phase) 103D.

FIG. 21 is a view showing a structural example of the oscillator 40 (a right side surface) seen from an X1 direction depicted in FIG. 20. As shown in this drawing, the exposed portions 41ae of the internal electrode 41a constituting a driving electrode (an A− phase) 101A− are short-circuited by an external electrode 111A−. The exposed portions 42ae of the internal electrode 42a constituting a driving electrode (an A+ phase) 101A+ are short-circuited by an external electrode 111A+. The exposed portions 41ae of the internal electrode 41a constituting a driving electrode (a B− phase) 101B− are short-circuited by an external electrode 111B−. The exposed portions 42ae of the internal electrode 42a constituting a driving electrode (a B+ phase) 101B+ are short-circuited by an external electrode 111B+. The exposed portions 42be of the internal electrode 42b constituting an oscillation detecting electrode (a C+ phase) 103C+ are short-circuited by an external electrode 113C+. The exposed portions 42be of the internal electrode 42b constituting an oscillation detecting electrode (a D+ phase) 103D+ are short-circuited by an external electrode 113D+.

FIG. 22 and FIG. 23 are views showing a structural example of the oscillator 40 (a left side surface) seen from an X2 direction depicted in FIG. 20.

As shown in FIG. 22, the exposed portions 41be of the internal electrode 41b constituting an oscillation detecting electrode (a C phase) 103C− are short-circuited by an external electrode 113C−. The exposed portions 41be of the internal electrode 41b constituting an oscillation detecting electrode (a D− phase) 103D− are short-circuited by an external electrode 113D−.

In the example depicted in FIG. 23, the exposed portion 41be associated with the oscillation detecting electrode (the C− phase) 103C− and the exposed portion 41be associated with the oscillation detecting electrode (the D− phase) 103D− are integrally short-circuited by an external electrode 113CD−. Adopting such a configuration enables further reducing the number of wiring lines as compared with a configuration adopting the example depicted in FIG. 22.

As described above, one surface on which the external electrodes connected to the drive circuit are arranged may be the side surface of the oscillator 40.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An ultrasonic motor comprising:
an oscillator whose cross section vertical to a central axis has a rectangular shape and which generates elliptic oscillation when longitudinal oscillation that expands or contracts in the central axis direction and torsional oscillation using the central axis as a torsional axis are simultaneously excited, a length ratio of a narrow side and a wide side constituting the rectangular shape being set to a predetermined value;
a driven body that comes into contact with an elliptic oscillation generation surface of the oscillator in which the elliptic oscillation is generated and is driven to rotate by the elliptic oscillation around the central axis; and
a pressing mechanism unit that presses the oscillator against the driven body and welds the elliptic oscillation generation surface of the oscillator to the driven body by pressing,
wherein the oscillator comprises driving electrodes and oscillation detecting electrodes near a node portion of the longitudinal oscillation and near ventral portions of the torsional oscillation,
an external electrode achieving electrical conduction with the driving electrodes and an external electrode associated with one polarity of an external electrode achieving the electrical conduction with the oscillation detecting electrodes are formed on a first surface of outer surfaces of the oscillator, and
an external electrode associated with the other polarity of the external electrode achieving the electrical conduction with the oscillation detection electrodes is formed on a second surface different from the first surface of the outer surfaces of the oscillator.

2. The ultrasonic motor according to claim 1, wherein the length ratio of the narrow side and the wide side constituting the rectangular shape is a value that substantially conforms a resonant frequency of the longitudinal oscillation to a resonant frequency of the torsional oscillation,
the longitudinal oscillation is longitudinal primary oscillation, and
the torsional oscillation is torsional secondary oscillation or torsional tertiary oscillation.

3. The ultrasonic motor according to claim 2, wherein a value of T/W is approximately 0.6 when the torsional oscillation is the torsional secondary oscillation, and
a value of T/W is approximately 0.3 when the torsional oscillation is the torsional tertiary oscillation,
where T is a length of the narrow side and W is a length of the wide side.

4. The ultrasonic motor according to claim 2, wherein both the driving electrodes and the oscillation detecting electrodes are provided for two phases, and
the oscillation detecting electrodes constituting one polarity are short-circuited by the external electrode on the second surface.

5. The ultrasonic motor according to claim 2, wherein both the driving electrodes and the oscillation detecting electrodes are provided for two phases,
the oscillator is obtained by laminating a rectangular piezoelectric sheet on which an internal electrode pattern constituting the driving electrodes and the oscillation detecting electrodes is formed, and
the oscillation detecting electrodes constituting one polarity are short-circuited in the internal electrode pattern formed on the piezoelectric sheet.

* * * * *